United States Patent
Zhu et al.

(10) Patent No.: US 11,611,733 B2
(45) Date of Patent: Mar. 21, 2023

(54) CROSS-VIEW IMAGE OPTIMIZING METHOD, APPARATUS, COMPUTER EQUIPMENT, AND READABLE STORAGE MEDIUM

(71) Applicant: Shenzhen University, Guangdong (CN)

(72) Inventors: Yingying Zhu, Guangdong (CN); Shihai Chen, Guangdong (CN)

(73) Assignee: Shenzhen University, Shenzhen (CN)

( * ) Notice: Subject to any disclaimer, the term of this patent is extended or adjusted under 35 U.S.C. 154(b) by 133 days.

(21) Appl. No.: 17/241,065

(22) Filed: Apr. 27, 2021

(65) Prior Publication Data
US 2022/0272312 A1 Aug. 25, 2022

(30) Foreign Application Priority Data
Feb. 22, 2021 (CN) .......................... 202110196603.3

(51) Int. Cl.
*H04N 13/00* (2018.01)
*G06V 10/32* (2022.01)
(Continued)

(52) U.S. Cl.
CPC ............. *H04N 13/00* (2013.01); *G06T 15/00* (2013.01); *G06V 10/32* (2022.01); *G06V 10/40* (2022.01);
(Continued)

(58) Field of Classification Search
CPC ........... H04N 13/00; H04N 2013/0088; H04N 2013/0092; G06T 15/00; G06T 15/20; G06T 15/205; G06T 2207/20084; G06T 3/4046; G06T 2207/20212; G06T 2207/20221; G06T 3/4038; G06T 5/50; G06V 10/32; G06V 10/40; G06V 10/44; G06V 10/454; G06V 10/82; G06V 10/806;
(Continued)

(56) References Cited

PUBLICATIONS

Ding et al. "Cross-view image synthesis with deformable convolution and attention mechanism"; Chinese Conference on Pattern Recognition and Computer Vision (PRCV); Springer, Cham (Year: 2020).*

(Continued)

*Primary Examiner* — Siamak Harandi
*Assistant Examiner* — Michael Adam Shariff (57) ABSTRACT

Disclosed is a cross-view image optimizing method and apparatus, and a computer equipment and a readable storage medium. The method includes: acquiring a sample image and a pre-trained cross-view image generating model; generating an multi-dimensional cross-view image of the sample image by a multi-dimensional feature extracting module of the first generator to obtain dimension features and cross-view initial images at multiple dimensions; obtaining a multi-dimensional feature map with corresponding dimension features by the second generator; inputting the multi-dimensional feature map to a multi-channel attention module of the second generator for feature extraction and calculating a feature weight of each attention channel, obtaining attention feature images, attention images and feature weights in a preset number of the attention channels; and weighting and summing the attention images and the attention feature images of all the channels according to the feature weights, and obtaining a cross-view target image.

17 Claims, 9 Drawing Sheets

(51) Int. Cl.
*G06V 10/40* (2022.01)
*G06T 15/00* (2011.01)

(52) U.S. Cl.
CPC ............... *H04N 2013/0088* (2013.01); *H04N 2013/0092* (2013.01)

(58) Field of Classification Search
CPC ............. G06V 30/1918; G06K 9/6217; G06K 9/6232; G06K 9/629; G06N 3/02; G06N 3/04; G06N 3/0454
See application file for complete search history.

(56) References Cited

PUBLICATIONS

Tang et al. "Multi-channel attention selection GAN with cascaded semantic guidance for cross-view image translation"; Proceedings of the IEEE/CVF conference on computer vision and pattern recognition (Year: 2019).*

* cited by examiner

CROSS-VIEW IMAGE OPTIMIZING METHOD, APPARATUS, COMPUTER EQUIPMENT, AND READABLE STORAGE MEDIUM

CROSS REFERENCE TO RELATED APPLICATIONS

The present application is based on Chinese patent application No. 202110196603.3 filed on Feb. 22, 2021 and claims its priority. The entire disclosure of the application is hereby incorporated by reference in its entirety.

TECHNICAL FIELD

The embodiments of the present application relate to image processing technology, and in particular, to a cross-view image optimizing method, apparatus, a computer equipment, and storage medium.

BACKGROUND TECHNOLOGY

In certain tasks in the field of computer technology, it is often necessary to obtain images of a target object in different three-dimensional perspectives. For example, in the field of image retrieval, a single angle of view of the image to be retrieved easily affects the retrieving accuracy; and in the field of unmanned driving, a single angle of view is unable to support the construction of a panoramic view. In practical application, acquiring multi-view images by image acquisition apparatus is costly and difficult to implement. Therefore, methods of training a generative adversarial network (GAN) to generate multi-view images of a target based on a single-view image thereof are widely applied.

In the prior art, the multi-view images generated by the above-mentioned methods are relatively rough, and the feature details of the images cannot meet requirements.

SUMMARY

The embodiments of the present application provide a cross-view image optimizing method and apparatus, a computer equipment, and a readable storage medium, aiming to solve the problem of poor quality of cross-view images generated by a generative adversarial network in the prior art.

In a first aspect, an embodiment of the present application provides a cross-view image optimizing method, which includes:

acquiring a sample image and a pre-trained cross-view image generating model, the cross-view image generating model includes a first generator and a second generator;

generating multi-dimensional cross-view images of the sample image by a multi-dimensional feature extracting module of the first generator to obtain dimension features and cross-view initial images of multiple dimensions;

normalizing the dimension features by a residual module of the second generator, and then obtaining optimized features by residual processing based on the cross-view initial images; and performing a down-sample processing and an up-sample processing on the optimized features followed by splicing to obtain a multi-dimensional feature map;

inputting the multi-dimensional feature map to a multi-channel attention module of the second generator for feature extraction and calculating a feature weight of each attention channel, obtaining attention feature images, attention images and feature weights in a preset number of the attention channels; and weighting and summing the attention images and the attention feature images of all the channels according to the feature weights, and obtaining a cross-view target image.

In a second aspect, an embodiment of the present application provides a cross-view image optimizing apparatus, which includes:

an acquiring module for acquiring a sample image and a pre-trained cross-view image generating model, the cross-view image generating model includes a first generator and a second generator;

an image generating module for generating multi-dimensional cross-view images of the sample image through a multi-dimensional feature extracting module of the first generator, and obtaining dimension features and cross-view initial images of multiple dimensions;

an optimizing module for performing normalization processing on the dimension features through a residual module of the second generator and then performing residual processing to obtain optimized features based on the cross-view initial images, performing down-sample processing and up-sample processing on the optimized features, followed by splicing to obtain a multi-dimensional feature map;

an attention feature extracting module for inputting the multi-dimensional feature map into a multi-channel attention module of the second generator for feature extraction and calculating a feature weight of each attention channel, and obtaining attention feature images, attention images and feature weights in a preset number of attention channels; and a synthesis module for weighting and summing the attention images and the attention feature images of all the channels according to the feature weights to obtain a cross-view target image.

In a third aspect, another embodiment of the present application provides a computer equipment, which includes: a memory, a processor, and a computer program that is stored on the memory and can run on the processor, and the processor implements the cross-view image optimizing method in the first aspect when the executing the computer program.

In a fourth aspect, yet another embodiment of the present application provides a computer-readable storage medium, which stores a computer program, and when the computer program is executed by a processor, the processor executes the cross-view image optimizing method described in the first aspect.

The embodiments of the present application provide a cross-view image optimizing method and apparatus, a computer equipment, and a readable storage medium. The method includes: acquiring a sample image and a pre-trained cross-view image generating model; generating multi-dimensional cross-view images of the sample image by a multi-dimensional feature extracting module of the first generator to obtain dimension features and cross-view initial images at multiple dimensions; normalizing the dimension features by a residual module of the second generator, and then obtaining optimized features by residual processing based on the cross-view initial images, and performing down-sample processing and up-sample processing on the optimized features followed by splicing to obtain a multi-dimensional feature map; inputting the multi-dimensional feature map to a multi-channel attention module of the second generator for feature extraction and calculating feature weight of each attention channel, obtaining attention feature images, attention images and feature weights in a preset number of the attention channels; and weighting and summing the attention images and the attention feature images of all the channels according to the feature weights, and obtaining a cross-view target image. The present method optimizes the image features and combines the multi-channel attention mechanism, making the cross-view image generated by the cross-view image generating model to have a higher quality with richer details.

BRIEF DESCRIPTION OF THE DRAWINGS

In order to more clearly illustrate the embodiments of the present application, the drawings used in the embodiments will be briefly described below. Obviously, the drawings in the following description are merely some embodiments of the present application, and other drawings may be obtained by those skilled in the art without any creative work.

DESCRIPTION OF THE EMBODIMENTS

The technical proposals in the embodiments will be clearly and completely described below with reference to the accompanying drawings of the embodiments of the application. It is apparent that the embodiments to be described below are merely a part of the embodiments of the present application, and not all of them. All other embodiments obtained by those skilled in the art based on the embodiments of the present application without creative efforts are within the scope of the present application.

It should be understood that, when used in this specification and the appended claims, the terms "include" and "comprise" indicate the presence of the described features, integers, steps, operations, elements and/or components, but do not preclude the presence or addition of a plurality of other features, integers, steps, operations, elements, components, and/or collections thereof.

It should also be understood that, the terms used in the specification of the present application are only for descriptive purpose and are not intended to limit the present application. As used in the embodiment of the present application and in the appended claims, the singular forms "a", "one" and "the" are intended to include the plural forms unless the context clearly indicates otherwise It should be further understood that the term "and/or" used in the specification of the present application and the appended claims refers to any combination and all possible combinations of one or more of the associated items listed, and includes these combinations.

Figure 1:
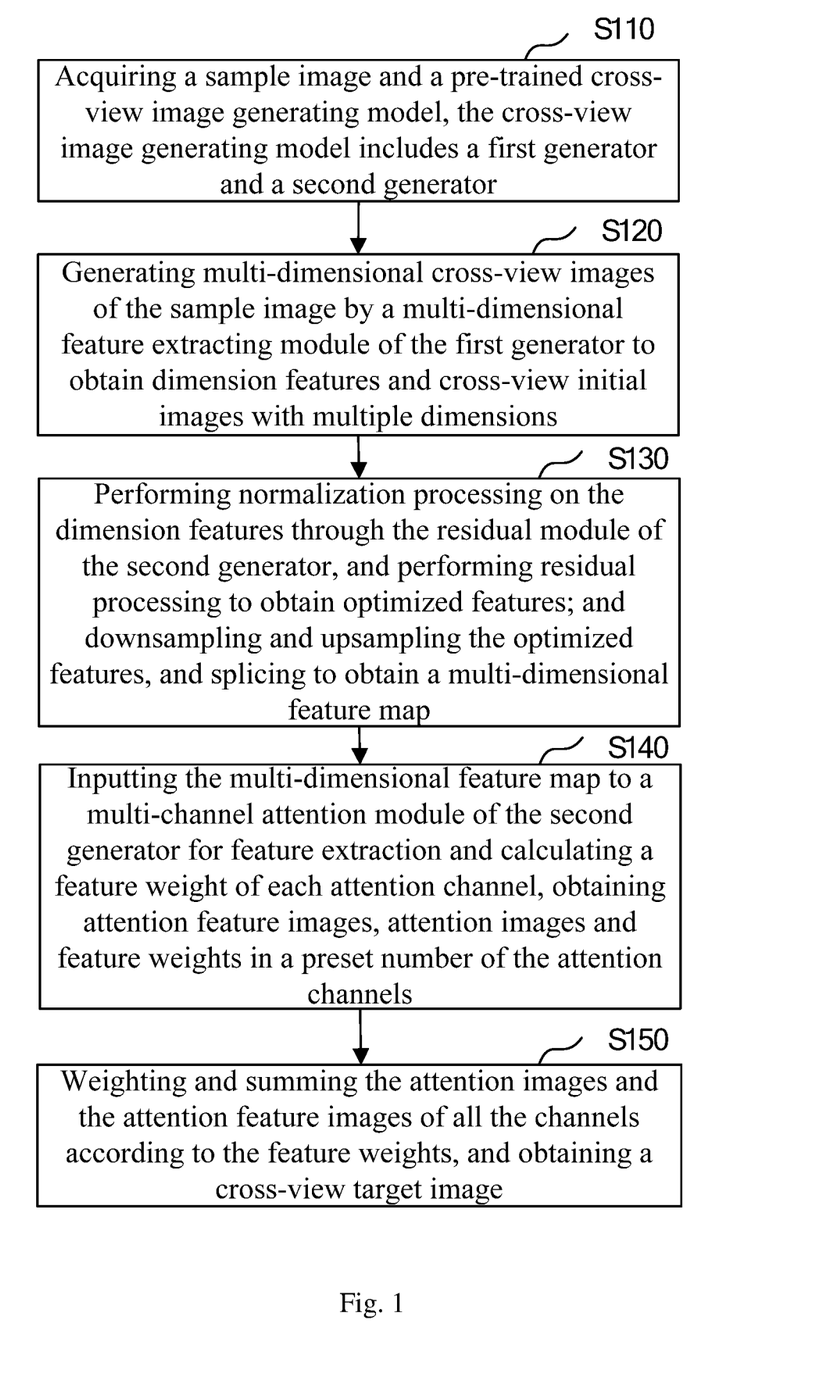
FIG. 1 is a flowchart of the cross-view image optimizing method provided by an embodiment of the present application.

Referring to FIG. 1, FIG. 1 is a flowchart of the cross-view image optimizing method provided by an embodiment of the present application, the method includes steps S110-S150.

Step S110: acquiring a sample image and a pre-trained cross-view image generating model, the cross-view image generating model includes a first generator and a second generator.

In the present embodiment, sample image pairs are used to train the cross-view image generating model in advance, so that the cross-view image generating model learns to generate cross-view images. The sample image pairs include N groups of images, and each group of image pairs includes an aerial image of a target scene or a target object and a corresponding single-viewpoint image. In this embodiment, the sample image may be an image of a scene or an object from a certain perspective. The cross-view image generating model is a generative adversarial network (GAN) model, including a first generator and a second generator. The first generator includes a down-sampling unit and three-dimensional up-sampling unit.

Step S120: generating multi-dimensional cross-view images of the sample image by a multi-dimensional feature extracting module of the first generator to obtain dimension features and cross-view initial images with multiple dimensions.

In the present embodiment, a plurality of feature extracting modules of different dimensions are set in the first generator to perform cross-view image extraction of multiple dimensions on the sample images to obtain dimension features of multiple dimensions, and a plurality of cross-view initial images of different dimensions are generated based on the dimension features of different dimensions. The dimensions herein are of different sizes, such as 16×16, 64×64, 256×256.

Figure 2:
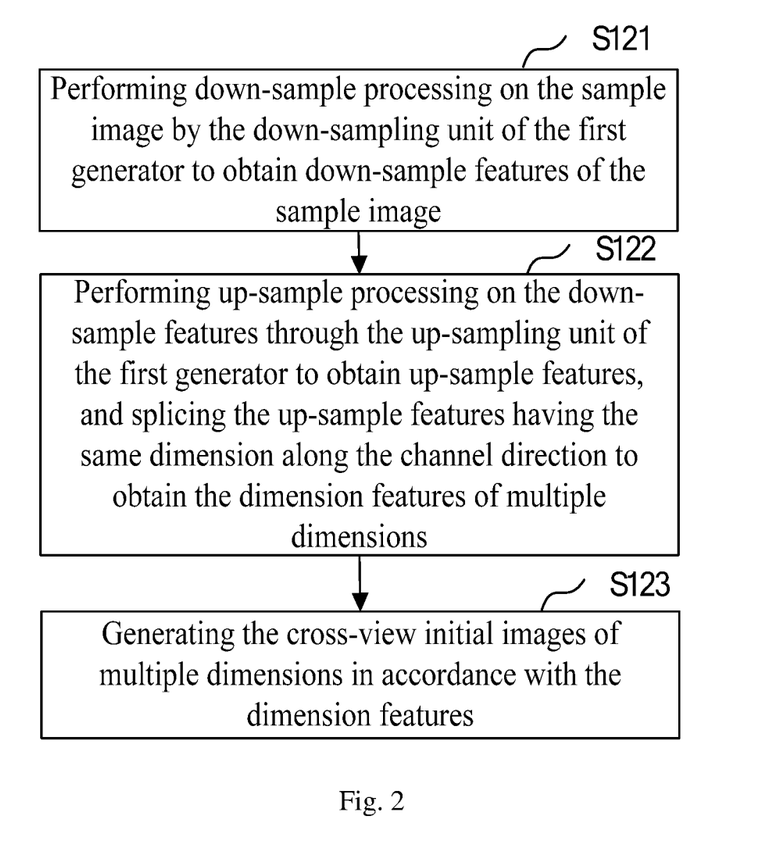
FIG. 2 is a flowchart of a sub-process of the cross-view image optimizing method provided by an embodiment of the present application.

In an embodiment, as shown in FIG. 2, Step S120 includes:

Step S121: performing down-sample processing on the sample image by the down-sampling unit of the first generator to obtain down-sample features of the sample image;

Step S122: performing up-sample processing on the down-sample features through the up-sampling unit of the first generator to obtain up-sample features, and splicing the up-sample features having the same dimension along the channel direction to obtain the dimension features of multiple dimensions;

Step S123: generating the cross-view initial images of multiple dimensions in accordance with the dimension features.

In the present embodiment, down-sample features of the sample image are obtained by performing down-sample processing on the sample image through the down-sampling unit of the first generator; and up-sample processing is performed on the down-sample features through the up-sampling unit of the first generator to obtain up-sample features, and the up-sample features having the same dimension are spliced along the channel direction to obtain the dimension features of multiple dimensions; finally the cross-view initial images of multiple dimensions are generated in accordance with the dimension features.

Figure 6:
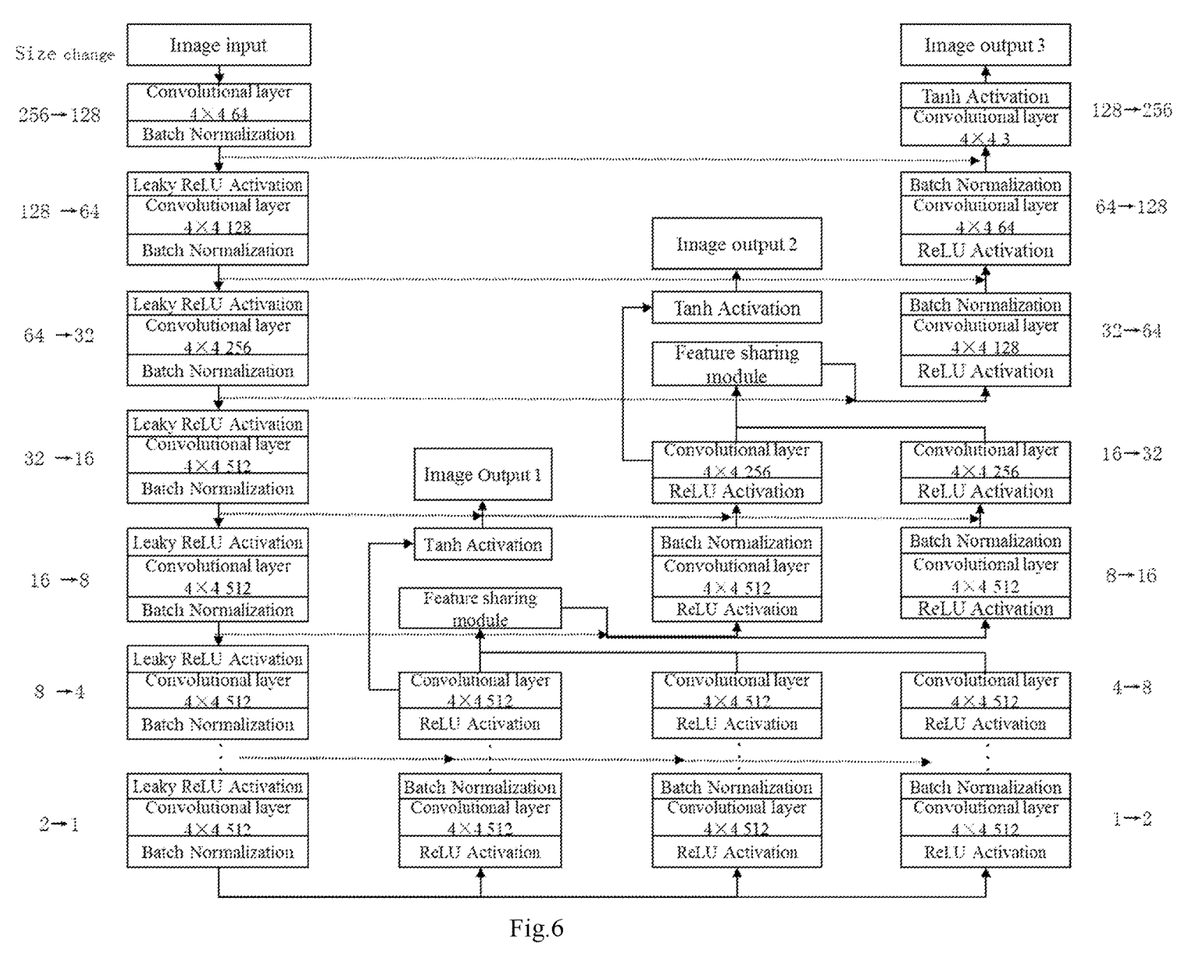
FIG. 6 is a block diagram of the network structure of the first generator used in the cross-view image optimizing method provided by an embodiment of the present application.

For example, as shown in FIG. 6, a sample image of a single angle of view is input into the first generator to obtain three cross-view initial images Img1, Img2, and Img3 (with sizes of 16×16, 64×64, and 256×256, respectively) from the same viewing angle and three dimension features: Feature_1, Feature_2, and Feature_3 (having dimensions of 8×8×512, 32×32×256, and 128×128×64, respectively). Dimension features of different dimensions are extracted from the input 256×256 sample image to 1×1 using the down-sampling unit of the first generator; then the dimension features of 1×1 are respectively up-sampled by three down-sampling units with different dimensions of the first generator to obtain cross-view initial images with dimensions of 16×16, 64×64, and 256×256, respectively, and dimension features with dimensions of 8×8×512, 32×32×256, and 128×128×64, respectively. A feature sharing module is used on those with the dimensions of 8×8 and 32×32, in order to allow the dimension features to have feature information with different resolutions in the decoding stage. It should be noted that since the up-sample features of the same dimension are spliced according to the channel direction (for example, for the dimension features of a size of 16×16 and 64×64, the final dimension feature of 16×16 is spliced with the dimension feature of 16×16 in the dimension of 64×64, and the spliced dimension features of 16×16 are up-sampled to 64×64 in the dimensions of 64×64). Therefore, dimension features with higher dimensions have the dimension features with lower dimensions, so the image generated by the highest dimension feature is eventually selected as the cross-view initial image for subsequent optimization (that is, Img3 is the cross-view initial image).

Step S130: performing normalization processing on the dimension features through the residual module of the second generator, and performing residual processing to obtain optimized features; and performing down-sample processing and up-sample processing on the optimized features, and splicing to obtain a multi-dimensional feature map.

In the present embodiment, based on the above steps, dimension features of the sample image having different dimensions are obtained. The dimension features are first normalized by the residual module of the second generator, and then the residual processing is performed to obtain optimized features. The optimized features are down-sampled and up-sampled, and spliced to obtain a multi-dimensional feature map. The residual module includes a first calculating unit and a second calculating unit, and the second calculating unit includes two first calculating units.

Figure 7:
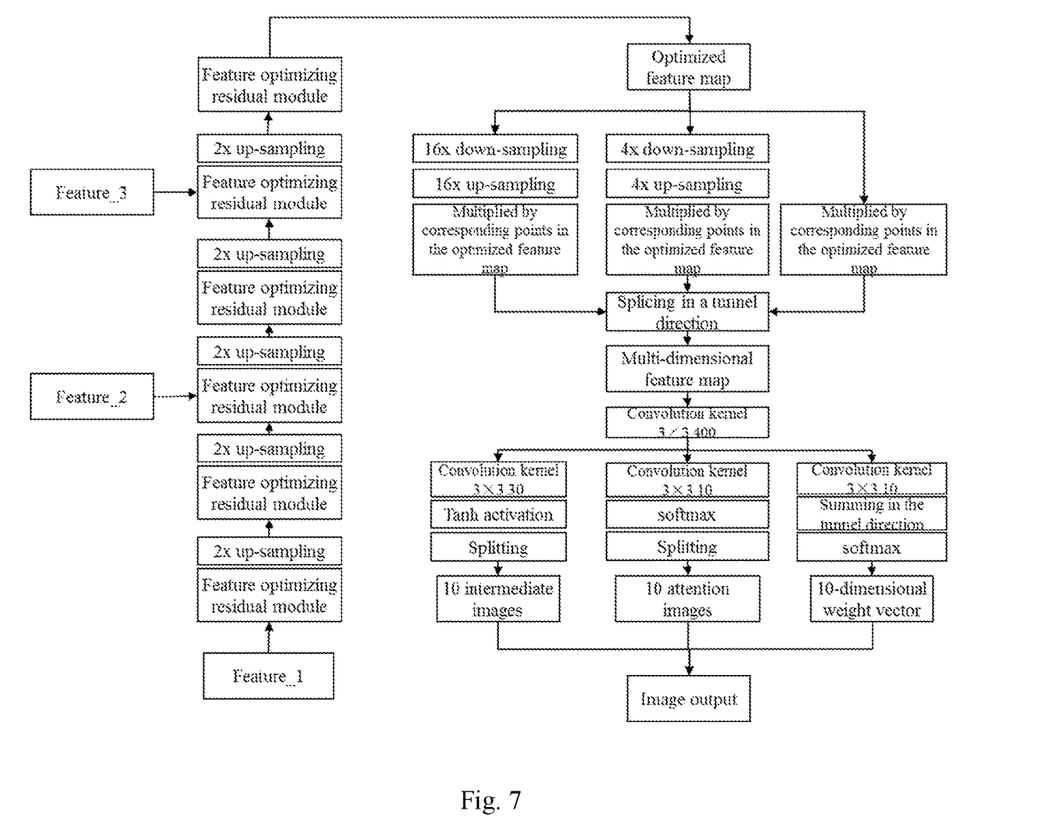
FIG. 7 is a block diagram of the network structure of the second generator used in the cross-view image optimizing method provided by an embodiment of the present application.

For example, as shown in FIG. 7, a cross-view initial image Img_3 (256×256) and three dimension features: Feature_1, Feature_2, and Feature_3 (having a dimension of 8×8×512, 32×32×256, 128×128×64) are preset. Firstly, Feature_1 of 8×8×512 is input into the residual module to optimize the dimension feature, and then is up-sampled to 16×16 to obtain an optimized feature of 16×16. The residual processing is repeated on the optimized feature of 16×16, followed by up-sample processing to 32×32, and the obtained optimized feature of 32×32 is spliced with Feature_2 in the channel direction to obtain a new optimized feature of 32×32. The residual processing and up-sample processing are repeated on the new optimized feature of 32×32 until a dimension of 128×128 is reached, and then the optimized feature map of 128×128 is spliced with Feature_3 in the channel direction. The processing is repeated until a size of 256×256 is reached, thus an optimized feature Feature_fg is obtained. Furthermore, the optimized feature Feature_fg is down-sampled to a size of 16×16 and 64×64, and then the obtained optimized features of 16×16 and 64×64 are respectively up-sampled to 256×256, obtaining Feature_fg1 and Feature_fg2.

A multi-dimensional feature map Feature_m is calculated from the equation below:

$$\text{Feature\_m}=\text{concat}(\text{Feature\_fg} \times \text{Feature\_fg1}, \text{Feature\_fg} \times \text{Feature\_fg2}, \text{Feature\_fg} \times \text{Feature\_fg})$$

where concat means splicing in the channel direction; × means multiplying corresponding points.

Figure 3:
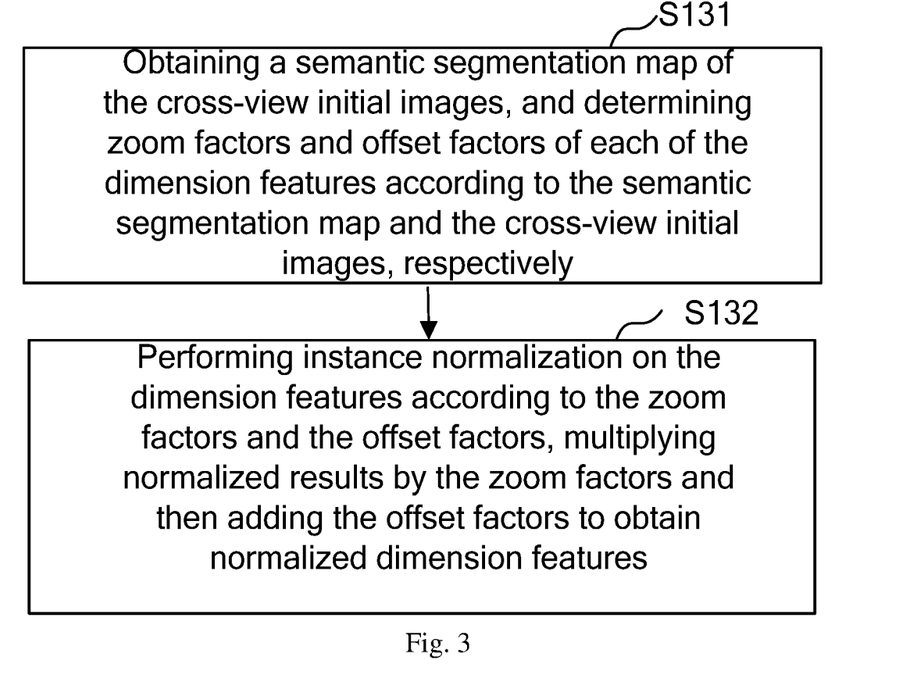
FIG. 3 is a flowchart of another sub-process of the cross-view image optimizing method provided by an embodiment of the present application.

In an embodiment, as shown in FIG. 3, Step S130 includes:

Step S131: obtaining a semantic segmentation map of the cross-view initial images, and determining zoom factors and offset factors of each of the dimension features according to the semantic segmentation map and the cross-view initial images, respectively. The zoom factors include a zoom factor of the semantic segmentation map and a zoom factor of the cross-view initial images, and the offset factors include an offset factor of the semantic segmentation map and an offset factor of the cross-view initial images.

Step S132: performing instance normalization on the dimension features according to the zoom factors and the offset factors, multiplying normalized results by the zoom factors and then adding the offset factors to obtain normalized dimension features.

In the present embodiment, feature normalization (FG-IN) is required before performing the residual processing on the dimension features, which includes: obtaining the semantic segmentation map of the cross-view initial image, and determining the zoom factors and offset factors of each of the dimension features according to the semantic segmentation map and the cross-view initial image, respectively, where the zoom factors include the zoom factor of the semantic segmentation map and the zoom factor of the cross-view initial image, and the offset factors include the offset factor of the semantic segmentation map and the offset factor of the cross-view initial image; and performing instance normalization on the dimension features according to the zoom factors and the offset factors, multiplying the normalized results by the zoom factors and then adding the offset factors to obtain the normalized dimension features.

Figure 8:
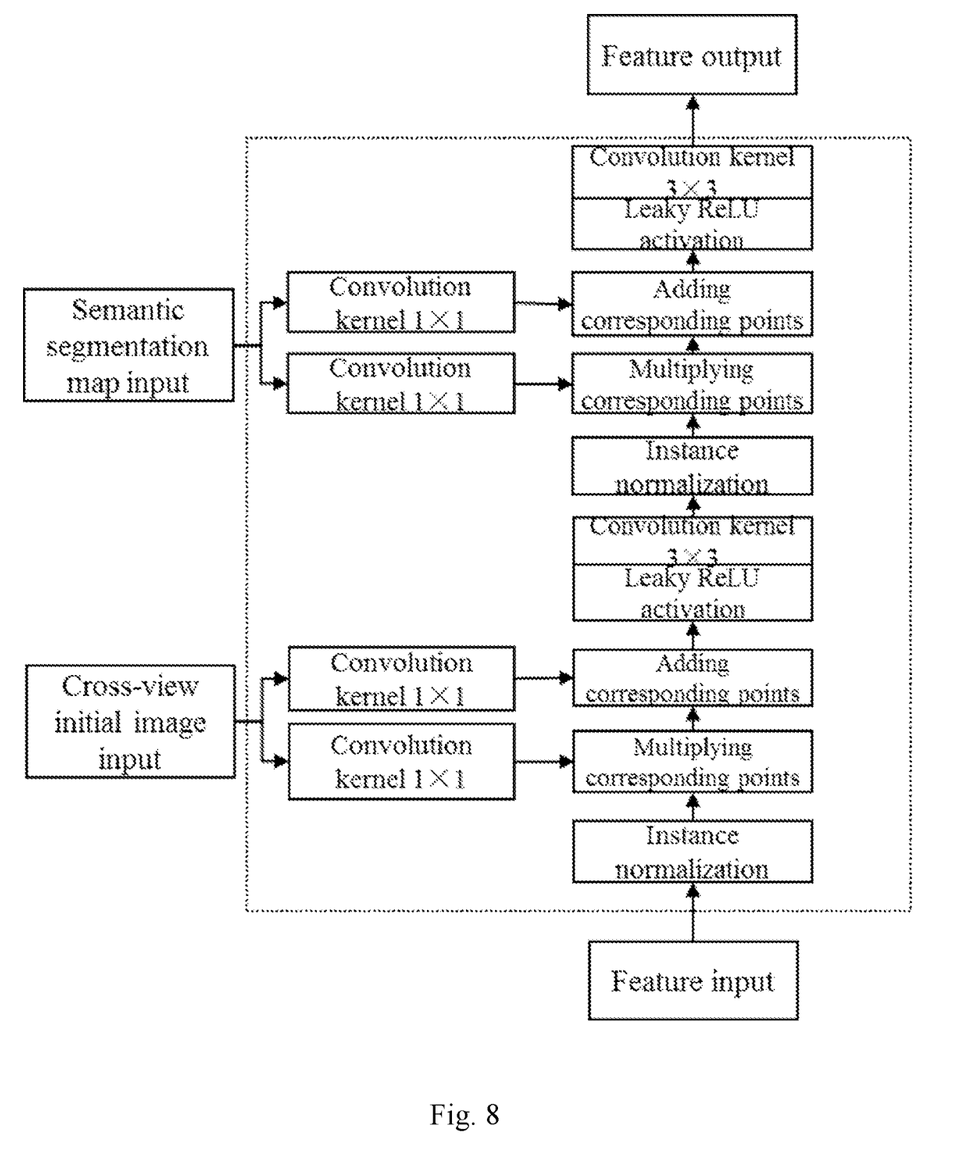
FIG. 8 is a flow chart of an instance normalization processing in the cross-view image optimizing method provided by an embodiment of the present application.

FIG. 8 shows a feature optimizing unit in the residual module, in a case in which there are three dimension features having different dimensions (8×8×512, 32×32×256, and 128×128×64, respectively), the dimension feature of 8×8×512, the cross-view initial image and the semantic segmentation map are firstly input into the instance normalization unit in the residual module of the second generator for feature normalization (FG-IN). The optimizing process includes: calculating a zoom factor and an offset factor of the cross-view initial image with respect to the dimension feature of 8×8×512, multiplying the normalized dimension feature of 8×8×512 by the zoom factor of the cross-view initial image, and adding the offset factor of the cross-view initial image to obtain an intermediate result; then inputting the intermediate result into the activation function and a convolutional layer for activation and convolution, and calculating the zoom factor and the offset factor of the semantic segmentation map with respect to the intermediate result with the dimension of 8×8×512 and multiplying the normalized intermediate result by the zoom factor of the semantic segmentation map and adding the offset factor of the semantic segmentation map to obtain the dimension feature of 8×8×512 after instance normalization. Here, the dimension feature having the dimension of 8×8×512 is used as an example of the instance normalization processing, similarly, the normalization processing is also performed on the dimension features of 32×32×256 and 128×128×64 before the residual processing.

Figure 4:
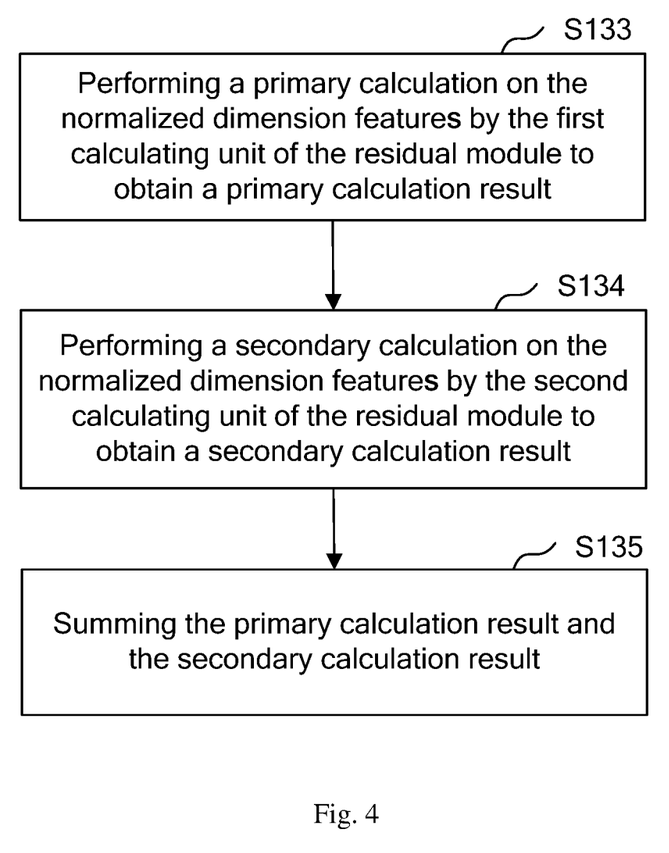
FIG. 4 is a flowchart of yet another sub-process of the cross-view image optimizing method provided by an embodiment of the present application.

In an embodiment, as shown in FIG. 4, step S130 includes:

Step S133: performing a primary calculation on the normalized dimension features by the first calculating unit of the residual module to obtain a primary calculation result.

Step S134: performing a secondary calculation on the normalized dimension features by the second calculating unit of the residual module to obtain a secondary calculation result.

Step S135: summing the primary calculation result and the secondary calculation result.

Figure 9:
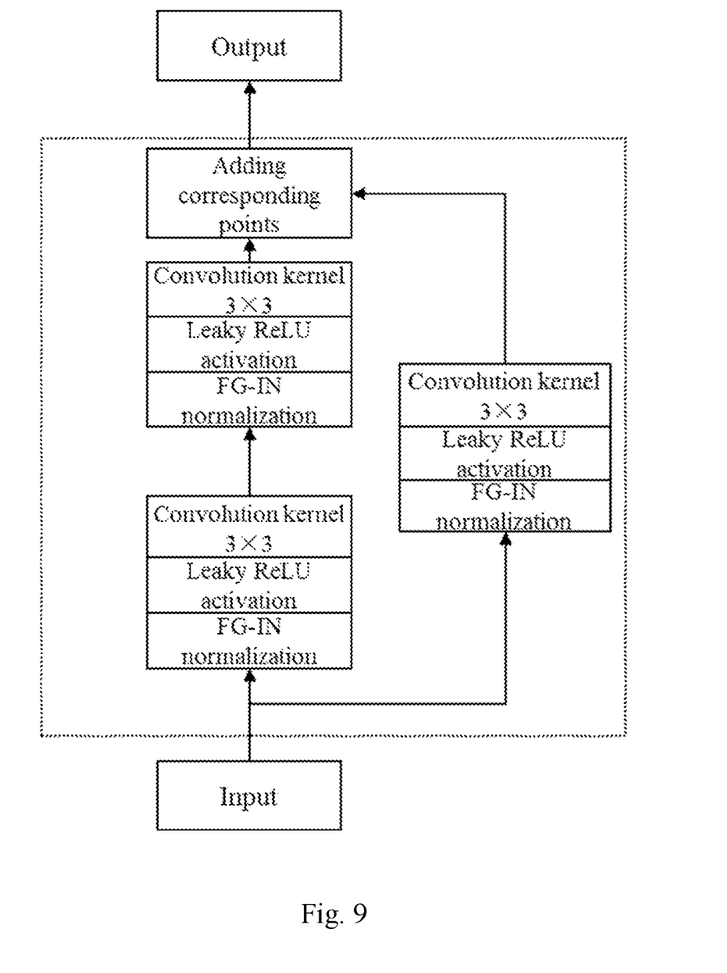
FIG. 9 is a flow chart of the network structure of the residual module in the cross-view image optimizing method provided by an embodiment of the present application.

In order to further optimize the dimension feature after the residual processing, in the present embodiment, the primary calculation is performed on the normalized dimension feature by the first calculating unit of the residual module to obtain a primary calculation result, and the secondary calculation is performed on the normalized dimension feature by the second calculating unit of the residual module to obtain a secondary calculation result, lastly, adding the primary calculation result and the secondary calculation result. As shown in FIG. 9, the residual module includes a first calculating unit and a second calculating unit. The second calculating unit includes two first calculating units, so that the dimension feature is calculated twice in the second calculating unit. The first calculating unit includes a FG-IN normalization layer, an activation function layer, and a convolutional layer, namely:

$$y=f(f(x))+f(x)$$

where y is the residual result, $f(x)$ is the primary calculation result, and $f(f(x))$ is the secondary calculation result.

Step S140: inputting the multi-dimensional feature map to a multi-channel attention module of the second generator for feature extraction and calculating a feature weight of each attention channel, obtaining attention feature images, attention images and feature weights in a preset number of the attention channels.

Step S150: weighting and summing the attention images and the attention feature images of all the channels according to the feature weights, and obtaining a cross-view target image.

In the present embodiment, the multi-dimensional feature map is input to a multi-channel attention module of the second generator for feature extraction, and feature weight of each attention channel is calculated, so that the attention feature images, attention images and feature weights in a preset number of the attention channels are obtained. Specifically, a feature map Feature_400 of 256×256×400 is obtained from the multi-dimensional feature map through a convolution kernel (kernel size is 3×3, stride is 1, padding is 1, output channel is 400) in the second generator, and three convolution kernels are further used to obtain feature maps of 256×256×30, 256×256×10, and 256×256×10 respectively. The feature map of 256×256×30 is activated using a tanh activation function and then split into 10 intermediate maps; the first feature map of 256×256×10 is activated using a softmax activation function and then split into 10 attention maps; the second feature map of 256×256×10 is summed in the channel direction and activated using the softmax activation function to obtain a weight vector of 1×1×10. Finally, corresponding points in the corresponding intermediate maps are multiplied by those in the corresponding attention maps, and then multiplied by the corresponding weights to obtain 10 optimized attention maps, and the 10 optimized attention maps are summed to obtain a cross-view target image Img_final.

It is to be noted, a rough semantic map is obtained by inputting the cross-view target image into a semantic map generator in the UNet network. L1 loss calculation is carried out on the generated rough semantic map and the real semantic map in the data set to provide weak self-supervision for the cross-view image generating model. In addition, the cross-view initial image Img_3 and the cross-view target image Img_final are respectively input into a discriminator network with a real image (source target image) to discriminate. The discriminator network uses a discriminator in the pix2pix network. The loss function used in the training process is consistent with the loss function in the Selection-GAN network.

This method optimizes the image features and combines the multi-channel attention mechanism so that the cross-view image generated by the cross-view image generating model may have a higher quality and more details.

Figure 5:
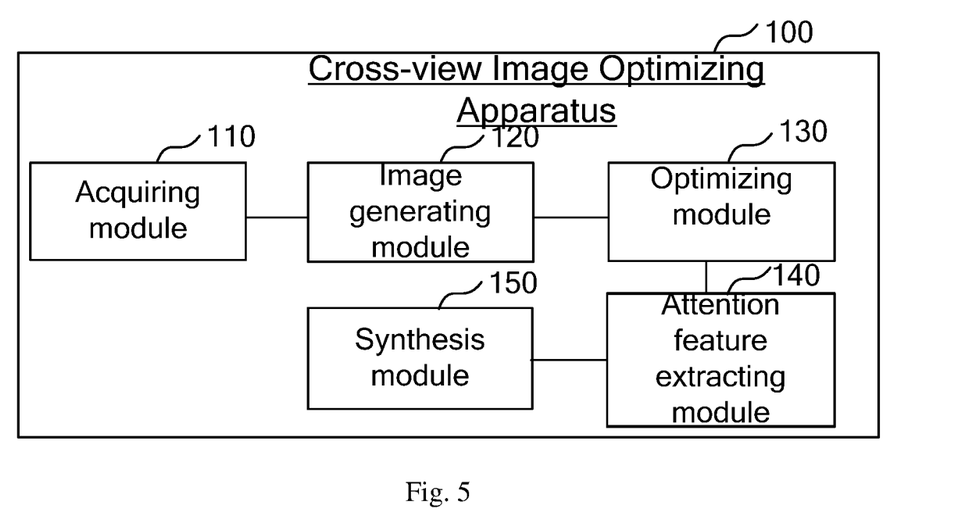
FIG. 5 is a block diagram of the cross-view image optimizing apparatus provided by an embodiment of the present application.

An embodiment of the present application further provides a cross-view image optimizing apparatus, which is used to perform any embodiment of the aforementioned cross-view image optimizing method. Specifically, referring to FIG. 5, FIG. 5 shows a block diagram of a cross-view image optimizing apparatus according to an embodiment of the present application. The cross-view image optimizing apparatus 100 may be configured in a server.

As shown in FIG. 5, the cross-view image optimizing apparatus 100 includes an acquiring module 110, an image generating module 120, an optimizing module 130, an attention feature extracting module 140, and a synthesis module 150.

The acquiring module 110 is used for acquiring a sample image and a pre-trained cross-view image generating model, the cross-view image generating model includes a first generator and a second generator.

The image generating module 120 is used for generating a multi-dimensional cross-view image of the sample image through a multi-dimensional feature extracting module of the first generator, and obtaining dimension features and cross-view initial images with multiple dimensions.

The optimizing module 130 is used for performing normalization processing on the dimension features through a residual module of the second generator and then performing residual processing to obtain optimized features based on the cross-view initial images, and performing down-sample processing and up-sample processing on the optimized features, followed by splicing to obtain a multi-dimensional feature map.

The attention feature extracting module 140 is used for inputting the multi-dimensional feature map into a multi-channel attention module of the second generator for feature extraction and calculating feature weight of each attention channel, and obtaining attention feature images, attention images and feature weights in a preset number of attention channels.

The synthesis module 150 is used for weighting and summing the attention images and the attention feature images of all the channels according to the feature weights to obtain a cross-view target image.

In an embodiment, the image generating module 120 includes:

a down-sampling unit for performing a down-sample processing on the sample image by the down-sampling unit of the first generator to obtain down-sample features of the sample image;

an up-sampling unit for performing an up-sample processing on the down-sample features through the up-sampling unit of the first generator to obtain up-sample features, and a splicing unit for splicing the up-sample features having the same dimension along the channel direction to obtain the dimension features of multiple dimensions; and an image generating unit for generating the cross-view initial images of multiple dimensions according to the dimension features.

In an embodiment, the optimizing module 130 includes:

a factor calculating unit for obtaining a semantic segmentation map of the cross-view initial images, and determining zoom factors and offset factors of each of the dimension features according to the semantic segmentation map and the cross-view initial images, respectively. The zoom factors include a zoom factor of the semantic segmentation map and zoom factors of the cross-view initial images, and the offset factors include an offset factor of the semantic segmentation map and offset factors of the cross-view initial images; and an optimizing unit for performing instance normalization on the dimension features according to the zoom factors and the offset factors, multiplying normalized results by the zoom factors and then adding the offset factors to obtain normalized dimension features.

In an embodiment, the optimizing module 130 further includes:

a primary calculating unit for performing a primary calculation on the normalized dimension features by the first calculating unit of the residual module to obtain a primary calculation result;

a secondary calculating unit for performing a secondary calculation on the normalized dimension features by the second calculating unit of the residual module to obtain a secondary calculation result; and a summing unit for summing the primary calculation result and the secondary calculation result.

An embodiment of the present application further provides a computer equipment, which includes: a memory, a processor, and a computer program that is stored on the memory and can run on the processor, and the processor implements the aforementioned cross-view image optimizing method when executing the computer program.

Another embodiment of the present application provides a computer-readable storage medium. The computer-readable storage medium may be a non-volatile computer-readable storage medium, which stores a computer program, and a processor implements the aforementioned cross-view image optimizing method when executing the computer program.

Those skilled in the art can clearly understand that, for the convenience and brevity of description, the specific working process of the equipment, apparatus and unit described above can refer to the corresponding process in the foregoing method embodiment, and will not be repeated here. Those skilled in the art can appreciate that the units and algorithm steps described in the exemplary embodiments can be implemented by electronic hardware, computer software, or a combination thereof. In order to clearly illustrate the interchangeability between the hardware and software, the exemplary components and steps are generally described in terms of their functions in the above description. Whether these functions are executed by hardware or software depends on the specific application and design constraints of the technical proposal. Professionals and technicians may use different methods for each specific application to implement the described functions, but such implementation should not be considered beyond the scope of the present application.

It should be understood that, in the embodiments provided by the present application, the disclosed equipment, apparatus, and method may be implemented in other ways. For example, the apparatus embodiments described above are merely illustrative, e.g. the unit division is merely logical function division. There may be other division in actual implementation, or the units with the same function may be combined into one. For instance, a plurality of units or components can be combined or integrated into another system, or some features can be omitted or not implemented. In addition, the displayed or discussed mutual coupling or direct coupling or communication connection may be indirect coupling or communication connection through some interfaces, devices or units, and may also be electrical, mechanical or other forms of connection.

The units described as separate components may or may not be physically separated, and the components displayed as units may or may not be physical units. That is, they may be located at one position, or they may be distributed on multiple network units. Some or all of the units may be selected according to actual needs to achieve the objectives of the embodiments of the present application.

Additionally, the functional units in the various embodiments of the present application may be integrated into one processing unit, or each unit may exist as a physically separated unit, or two or more units may be integrated into one. The above-mentioned integrated unit can be implemented in the form of hardware or software functional unit.

The integrated unit may be stored in a storage medium if it is implemented in the form of a software functional unit and sold or used as an independent product. Based on this understanding, the substantial technical proposal of the present application, or the part that contributes to the existing technology, or all or part of the technical proposal can be implemented in the form of a software, and the computer software is stored in a storage medium, and includes several instructions for a computer device (which may be a personal computer, a server, or a network device, etc.) to execute all or part of the steps of the method described in the various embodiments of the present application. The aforementioned storage medium includes: a USB disk, a mobile hard disk, Read-Only Memory (ROM), magnetic disk or optical disk and other media that can store program codes.

The above are merely the detailed embodiments of the present application, but the scope of protection of the present application is not limited thereto. Any one skilled in the art can easily think of various equivalent modifications or substitutions within the technical scope disclosed in the present application. These modifications or substitutions shall fall within the scope of protection of the present application. Therefore, the scope of protection of the present application is defined by the appended claims.

What is claimed is:

1. A cross-view image optimizing method, comprising:
acquiring a sample image and a pre-trained cross-view image generating model, the cross-view image generating model including a first generator and a second generator;
generating multi-dimensional cross-view images of the sample image by a multi-dimensional feature extracting module of the first generator to obtain dimension features and cross-view initial images of multiple dimensions;

normalizing the dimension features by a residual module of the second generator, and then obtaining optimized features by residual processing based on the cross-view initial images; and performing down-sample processing and up-sample processing on the optimized features followed by splicing to obtain a multi-dimensional feature map;

inputting the multi-dimensional feature map to a multi-channel attention module of the second generator for feature extraction and calculating a feature weight of each attention channel, obtaining attention feature images, attention images and feature weights in a preset number of the attention channels; and weighting and summing the attention images and the attention feature images of all the channels according to the feature weights, and obtaining a cross-view target image;

wherein the normalizing of the dimension features by the residual module of the second generator, comprises:

obtaining a semantic segmentation map of the cross-view initial images, and determining zoom factors and offset factors of each of the dimension features according to the semantic segmentation map and the cross-view initial images, respectively, the zoom factors including a zoom factor of the semantic segmentation map and a zoom factor of the cross-view initial images, and the offset factors including an offset factor of the semantic segmentation map and an offset factor of the cross-view initial images; and performing instance normalization on the dimension features according to the zoom factors and the offset factors, multiplying normalized results by the zoom factors and then adding the offset factors to obtain normalized dimension features.

2. The cross-view image optimizing method according to claim 1, wherein the multi-dimensional feature extracting module comprises a down-sampling unit and a three-dimensional up-sampling unit.

3. The cross-view image optimizing method according to claim 2, wherein the generating of the multi-dimensional cross-view images of the sample image by the multi-dimensional feature extracting module of the first generator to obtain dimension features and cross-view initial images of multiple dimensions, comprises:

performing down-sample processing on the sample image by the down-sampling unit to obtain down-sample features of the sample image;

performing up-sample processing on the down-sample features through the up-sampling unit to obtain up-sample features, and splicing the up-sample features having a same dimension along a channel direction to obtain the dimension features of multiple dimensions; and generating the cross-view initial images of multiple dimensions in accordance with the dimension features.

4. The cross-view image optimizing method according to claim 1, wherein the residual module includes a first calculating unit and a second calculating unit, and the second calculating unit includes two first calculating units.

5. The cross-view image optimizing method according to claim 4, wherein the residual processing comprises:

performing a primary calculation on the normalized dimension features by the first calculating unit of the residual module to obtain a primary calculation result;

performing a secondary calculation on the normalized dimension features by the second calculating unit of the residual module to obtain a secondary calculation result; and summing the primary calculation result and the secondary calculation result.

6. A cross-view image optimizing apparatus, comprising:

an acquiring module for acquiring a sample image and a pre-trained cross-view image generating model, the cross-view image generating model including a first generator and a second generator;

an image generating module for generating multi-dimensional cross-view images of the sample image through a multi-dimensional feature extracting module of the first generator, and obtaining dimension features and cross-view initial images of multiple dimensions;

an optimizing module for performing normalization processing on the dimension features through a residual module of the second generator and then performing residual processing to obtain optimized features based on the cross-view initial images, performing down-sample processing and up-sample processing on the optimized features, followed by splicing to obtain a multi-dimensional feature map;

an attention feature extracting module for inputting the multi-dimensional feature map into a multi-channel attention module of the second generator for feature extraction and calculating a feature weight of each attention channel, and obtaining attention feature images, attention images and feature weights in a preset number of attention channels; and a synthesis module for weighting and summing the attention images and the attention feature images of all the channels according to the feature weights to obtain a cross-view target image;

wherein the normalization processing on the dimension features through the residual module of the second generator, comprises:

obtaining a semantic segmentation map of the cross-view initial images, and determining zoom factors and offset factors of each of the dimension features according to the semantic segmentation map and the cross-view initial images, respectively, the zoom factors including a zoom factor of the semantic segmentation map and a zoom factor of the cross-view initial images, and the offset factors including an offset factor of the semantic segmentation map and an offset factor of the cross-view initial images; and performing instance normalization on the dimension features according to the zoom factors and the offset factors, multiplying normalized results by the zoom factors and then adding the offset factors to obtain normalized dimension features.

7. The cross-view image optimizing apparatus according to claim 6, wherein the image generating module comprises:

a down-sampling unit for performing down-sample processing on the sample image by the down-sampling unit of the first generator to obtain down-sample features of the sample image;

an up-sampling unit for performing up-sample processing on the down-sample features through the up-sampling unit of the first generator to obtain up-sample features, and splicing the up-sample features having a same dimension along a channel direction to obtain the dimension features of multiple dimensions; and an image generating unit for generating the cross-view initial images of multiple dimensions according to the dimension features.

8. A computer equipment, comprising: a memory; a processor; and a computer program that is stored on the memory and runnable on the processor, the processor executing the computer program and implementing a cross-view image optimizing method, comprising: acquiring a sample image and a pre-trained cross-view image generating model, the cross-view image generating model including a first generator and a second generator;
generating multi-dimensional cross-view images of the sample image by a multi-dimensional feature extracting module of the first generator to obtain dimension features and cross-view initial images of multiple dimensions;
normalizing the dimension features by a residual module of the second generator, and then obtaining optimized features by residual processing based on the cross-view initial images; and performing down-sample processing and up-sample processing on the optimized features followed by splicing to obtain a multi-dimensional feature map;
inputting the multi-dimensional feature map to a multi-channel attention module of the second generator for feature extraction and calculating a feature weight of each attention channel, obtaining attention feature images, attention images and feature weights in a preset number of the attention channels; and
weighting and summing the attention images and the attention feature images of all the channels according to the feature weights, and obtaining a cross-view target image;
wherein the normalizing of the dimension features by the residual module of the second generator, comprises:
obtaining a semantic segmentation map of the cross-view initial images, and determining zoom factors and offset factors of each of the dimension features according to the semantic segmentation map and the cross-view initial images, respectively, the zoom factors including a zoom factor of the semantic segmentation map and a zoom factor of the cross-view initial images, and the offset factors including an offset factor of the semantic segmentation map and an offset factor of the cross-view initial images; and
performing instance normalization on the dimension features according to the zoom factors and the offset factors, multiplying normalized results by the zoom factors and then adding the offset factors to obtain normalized dimension features.

9. The computer equipment according to claim 8, wherein the multi-dimensional feature extracting module comprises a down-sampling unit and a three-dimensional up-sampling unit.

10. The computer equipment according to claim 9, wherein the generating of the multi-dimensional cross-view images of the sample image by the multi-dimensional feature extracting module of the first generator to obtain dimension features and cross-view initial images of multiple dimensions, comprises:
performing down-sample processing on the sample image by the down-sampling unit to obtain down-sample features of the sample image;
performing up-sample processing on the down-sample features through the up-sampling unit to obtain up-sample features, and splicing the up-sample features having a same dimension along a channel direction to obtain the dimension features of multiple dimensions; and
generating the cross-view initial images of multiple dimensions in accordance with the dimension features.

11. The computer equipment according to claim 8, wherein the residual module includes a first calculating unit and a second calculating unit, and the second calculating unit includes two first calculating units.

12. The computer equipment according to claim 11, wherein the residual processing comprises:
performing a primary calculation on the normalized dimension features by the first calculating unit of the residual module to obtain a primary calculation result;
performing a secondary calculation on the normalized dimension features by the second calculating unit of the residual module to obtain a secondary calculation result; and
summing the primary calculation result and the secondary calculation result.

13. A non-transitory computer-readable storage medium storing a computer program which, when executed by a processor, implements a cross-view image optimizing method, comprising:
acquiring a sample image and a pre-trained cross-view image generating model, the cross-view image generating model including a first generator and a second generator;
generating multi-dimensional cross-view images of the sample image by a multi-dimensional feature extracting module of the first generator to obtain dimension features and cross-view initial images of multiple dimensions;
normalizing the dimension features by a residual module of the second generator, and then obtaining optimized features by residual processing based on the cross-view initial images; and performing down-sample processing and up-sample processing on the optimized features followed by splicing to obtain a multi-dimensional feature map;
inputting the multi-dimensional feature map to a multi-channel attention module of the second generator for feature extraction and calculating a feature weight of each attention channel, obtaining attention feature images, attention images and feature weights in a preset number of the attention channels; and
weighting and summing the attention images and the attention feature images of all the channels according to the feature weights, and obtaining a cross-view target image;
wherein the normalizing of the dimension features by the residual module of the second generator, comprises:
obtaining a semantic segmentation map of the cross-view initial images, and determining zoom factors and offset factors of each of the dimension features according to the semantic segmentation map and the cross-view initial images, respectively, the zoom factors including a zoom factor of the semantic segmentation map and a zoom factor of the cross-view initial images, and the offset factors including an offset factor of the semantic segmentation map and an offset factor of the cross-view initial images; and
performing instance normalization on the dimension features according to the zoom factors and the offset factors, multiplying normalized results by the zoom factors and then adding the offset factors to obtain normalized dimension features.

14. The non-transitory computer-readable storage medium according to claim 13, wherein the multi-dimensional feature extracting module comprises a down-sampling unit and a three-dimensional up-sampling unit.

15. The non-transitory computer-readable storage medium according to claim 14, wherein the generating of the multi-dimensional cross-view images of the sample image by the multi-dimensional feature extracting module of the first generator to obtain dimension features and cross-view initial images of multiple dimensions, comprises:
   performing down-sample processing on the sample image by the down-sampling unit to obtain down-sample features of the sample image;
   performing up-sample processing on the down-sample features through the up-sampling unit to obtain up-sample features, and splicing the up-sample features having a same dimension along a channel direction to obtain the dimension features of multiple dimensions; and
   generating the cross-view initial images of multiple dimensions in accordance with the dimension features.

16. The non-transitory computer-readable storage medium according to claim 13, wherein the residual module includes a first calculating unit and a second calculating unit, and the second calculating unit includes two first calculating units.

17. The non-transitory computer-readable storage medium according to claim 16, wherein the residual processing comprises:
   performing a primary calculation on the normalized dimension features by the first calculating unit of the residual module to obtain a primary calculation result;
   performing a secondary calculation on the normalized dimension features by the second calculating unit of the residual module to obtain a secondary calculation result; and
   summing the primary calculation result and the secondary calculation result.

* * * * *